Oct. 4, 1932.                H. W. HEM                1,880,446
                          WEIGHING MACHINE
                        Filed Feb. 16, 1931
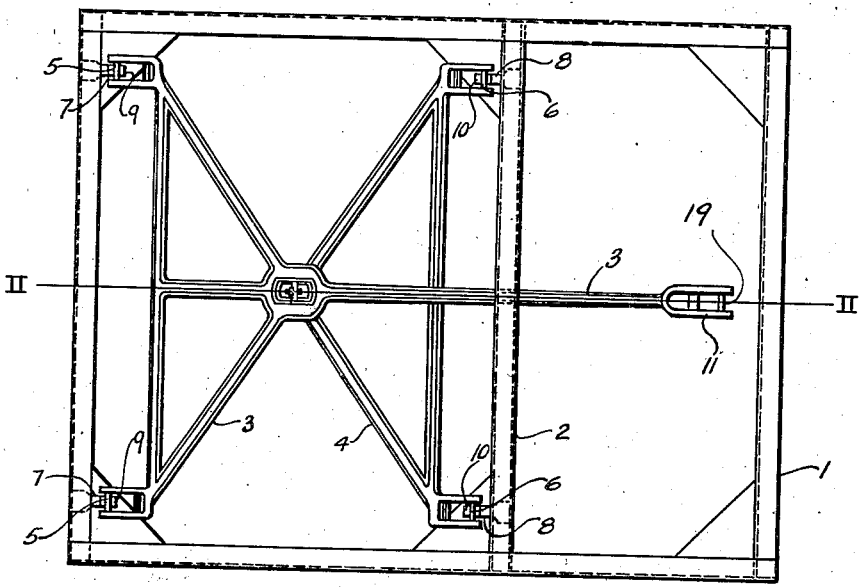
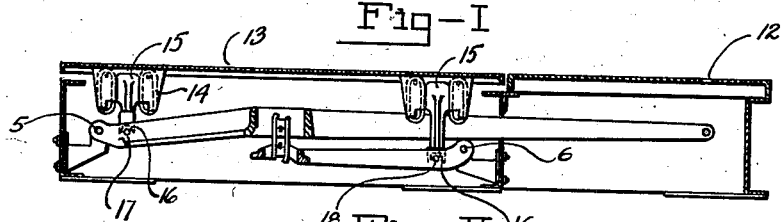
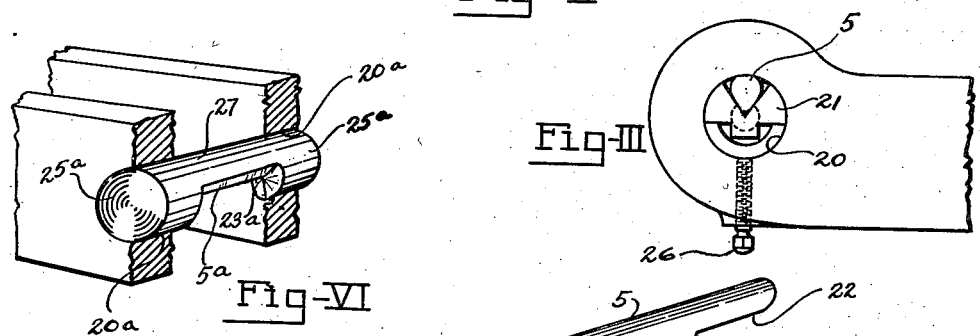
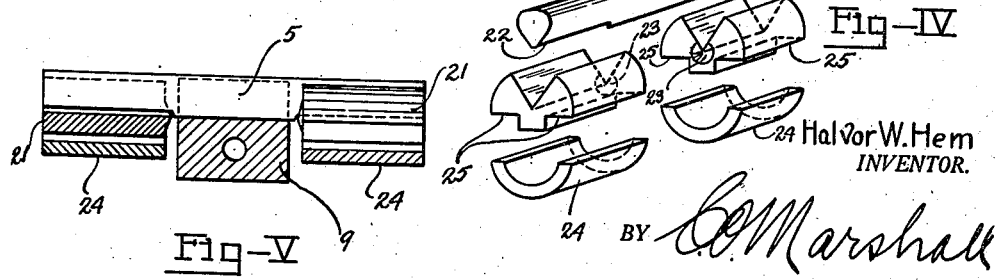
Halvor W. Hem
INVENTOR.
BY *E. C. Marshall*
ATTORNEY.

Patented Oct. 4, 1932

1,880,446

UNITED STATES PATENT OFFICE

HALVOR W. HEM, OF TOLEDO, OHIO, ASSIGNOR TO TOLEDO SCALE MANUFACTURING COMPANY, OF TOLEDO, OHIO, A CORPORATION OF NEW JERSEY

WEIGHING MACHINE

Application filed February 16, 1931. Serial No. 515,989.

This invention relates to weighing scales and particularly to means for retaining pivots in scale elements in a manner so that the spaced relationship between them is invariably maintained. Heretofore, pivots were fixed in scale levers and other elements and the required distances between them were accurately determined by honing or grinding; or the pivots were held in place by means of retainers which were made so that the pivot edges could be slightly adjusted. I have found that the latter practice is not economical, and also that after the scale is installed, incompetent mechanics whose duty it is to service such installations are apt to destroy the original accuracy of the scale. The former method of honing the pivot edges to the correct distance is inapplicable to pivots which are made of steel-aluminum alloys and hardened by the nitriding process. This produces a pivot on which the surface is extremely hard, and as the hardness decreases towards the inside of the pivot, it is important that this outer surface remain intact. It is possible to obtain an outer surface which has a Brinnell hardness of about 1200. When, however, the outer surface is removed by honing, for example, if .012 of an inch is honed off the pivot, the Brinnell number would only be, substantially, 600, that is, about the hardness of a pivot made from the ordinary pivot steel and hardened by the usual method.

It is a recognized fact that the condition of the scale pivots determine the accuracy and the sensitiveness of any scale. Rust and corrosion are great factors in reducing the accuracy and life of such scales and when a pivot is made according to this invention which permits the use of nitriding process, the life of a scale is greatly lengthened as the surface of such a pivot is extremely rust resistant.

Pivots of the type herein referred to, which are fixed in the lever by the co-operation of a retainer, must also be provided with means which limit the movement of a bearing on the edge of the pivot. Such means are generally called bearing thrusts. Thrust points must be directly coincident with the pivot edge, otherwise, deleterious friction between the thrust and the bearing will result.

The principal object of this invention resides therefore, in the provision of improved means for retaining pivots in a scale element, in a manner, so that no adjustments are necessary in determining the spaced relationship between the pivots.

Another object is the provision of improved means for providing thrusts, in combination with pivots, which are invariably coincident with the knife edge.

These and other objects and advantages will be apparent from the following specification in which reference is had to the accompanying drawing and in which similar reference numerals designate similar parts throughout the several views.

In the drawing:—

Figure I is a scale platform lever mechanism, the platform being removed, embodying my invention.

Figure II is a side elevational view thereof, the frame sectioned substantially along the line II—II of Figure I, and portions of the levers being broken away.

Figure III is an enlarged fragmentary view of a portion of a scale lever and a fulcrum pivot, embodying the invention, situated therein.

Figure IV are enlarged views of the pivots, the retainers, and the clamping caps of the pivot structure embodying the invention.

Figure V is an enlarged fragmentary cross sectional view through the retainer and bearing showing the relationship in detail; and Figure VI illustrates a modified form of a pivot embodying the invention.

Referring to the drawing in detail, the platform mechanism shown consists of a box like frame 1 usually made of architectural or structural iron and is divided into two compartments by a channel member 2. The larger compartment contains a load supporting lever system comprising a long main lever 3 and a short auxiliary lever 4. These levers are provided with fulcrum, load and nose pivots which are in spaced relation to each other. The fulcrum pivots 5 and 6 stationed in bifurcations of the long and short levers respectively, rest upon fulcrum brackets 7 and 8 in which a plurality of bearings 9 and 10 are located. The nose iron 11 of the lever 3 extends through an aperture in the dividing member 2 into the other compartment of the frame 1. This compartment is covered by a stationary deck or platform 12 upon which the counterbalancing mechanism of the scale (not shown) is mounted. A platform 13 is suspended by suitable links 14 from a plurality of bearing brackets 15 which rest by means of the bearings 16 on the load pivots 17 and 18 in the levers 3 and 4 respectively. A pivot 19 is stationed in the nose of the lever 3 and serves to transmit the force of a load on the platform to the counterbalancing mechanism. Of the pivots 5, 6, 17 and 18 in which my invention resides, we may take pivot 5 as an example, this pivot may be of any desired cross section provided that the height, that is, the distance from the knife edge to the back of the pivot is exactly one-half the diameter of a cylindrical bore 20 (Figure III) in the lever. The back of the pivot is preferably rounded, the radial point being on the edge of the knife. A retainer 21 which has a substantially round cross section is provided with a groove for the reception of the pivot. The depth of this groove is such that when it is located within the round bore 20, the apex of the groove is coincident with the axis of the bore. The pivot is of such length that it extends through the bifurcations and spans the opening between the arms.

It is very difficult to cut a V-groove for a pivot so that the apex is as sharp as the knife edge and to obviate this difficulty, the pivot has portions 22 removed from its knife edge. This may be done before hardening. The length of the removed portions is just slightly greater than the length of the pivot retainer 21 plus the thrust portion 23. This thrust is in the form of a cone turned on the end of the retainer and its apex is also on the axis of the bore 22 and coincident with the pivot edge and serves as an anti-friction thrust for the bearing 9. The co-operative relation of these parts is plainly shown in Figure V. Clamp plates 24 formed to the radius of the bore are adapted to rest against abutments 25 of the pivot retainer 21 and pressure exerted upon them by the locking screws 26 lock the pivot and the retainers with their thrusts securely in the bifurcations of the lever. A modification of the pivot is shown in Figure VI. This form also assures a pivot for insertion in bores in a scale element in such a manner that the edge of the pivot will always be coincident with the axis of the bore. This pivot comprises a body portion 27 having a substantially tapered cylindrical cross section. The center of the body portion is milled off forming a knife edge 5a. The ends 25a, as previously stated, are tapered and when driven into tapered holes 20a, the pivot will be securely fastened against movement. It is the intention to set the milling cutters, when forming the knife edge 5a at such an angle to the axis of the body that the thrust points 23a are formed as a matter of course.

When the holes or bores in the levers or other scale elements are accurately placed, the pivots herein described will always maintain their correct relation with each other without resort being had to very delicate honing and difficult pivot setting operations and replacements may be made by inexpert mechanics without detriment of accuracy to the scale.

While it will be apparent that the illustrated embodiments of my invention herein disclosed are well calculated to adequately fulfill the objects primarily stated. It is to be understood that the invention is susceptible to variation, modification and change within the spirit and scope of the subjoined claims.

Having described my invention, I claim:—

1. A weighing scale pivot adapted to be fixed in a cylindrical bore in a scale element comprising a knife edge, a body portion adapted to enter such cylindrical bore and having a thrust point coincident with the apex of the knife edge of said pivot and the axis of such circular bore.

2. In a weighing scale, in combination, a platform supporting system comprising a lever having a pivot retained therein, said retaining means comprising a substantially circular body portion having an angular kerf, the apex of said kerf being on the longitudinal axis of said circular body, a conical thrust integrally formed on said body portion, its apex coincident with the longitudinal axis of said substantially circular body portion and a pivot seated within said angular kerf with its knife edge coincident with the apex of said thrust.

3. In a weighing scale, in combination, a load supporting lever system comprising a lever having fulcrum and load pivots, each of said pivots having a substantially circular body portion adapted to be fixed in said lever, said body portion being tapered and having a projecting point and a knife edge, characterized in that said projecting point and said knife edge are coincident with the longitudinal axis of said circular body portion.

4. In a weighing scale, in combination, a lever having bifurcations and knife edged pivots fixed in bores in said bifurcations, said pivots having their edges coincident with the axis of said circular bores and their backs in contact with the cylindrical walls of such bores and retainers having substantially circular cross sections, grooves for the reception of said pivots in said retainers and thrusts with their contact points on the lines of the knife edges and coincident with the axes of the bores and said retainers being adapted to retain said pivots in the bifurcations of the levers.

HALVOR W. HEM.